N. J. LEWIS.
AXLE.
APPLICATION FILED APR. 14, 1917.

1,248,684.

Patented Dec. 4, 1917.

Inventor
Newton J. Lewis,

By

Attorneys

UNITED STATES PATENT OFFICE.

NEWTON J. LEWIS, OF WILMINGTON, OHIO, ASSIGNOR OF ONE-HALF TO WILMINGTON AUTO COMPANY, OF WILMINGTON, OHIO, A CORPORATION OF OHIO.

AXLE.

1,248,684.     Specification of Letters Patent.     Patented Dec. 4, 1917.

Application filed April 14, 1917. Serial No. 161,936.

*To all whom it may concern:*

Be it known that I, NEWTON J. LEWIS, a citizen of the United States, residing at Wilmington, in the county of Clinton and State of Ohio, have invented certain new and useful Improvements in Axles, of which the following is a specification, reference being had therein to the accompanying drawing.

My invention relates to axles, and in particular to supplemental axles to be used in case of the breakage of the main axle of a vehicle.

The object of my invention is to provide a supplemental axle which may be readily attached to the main axle without strain or alteration in position of the parts of the remainder of the mechanism of the vehicle.

It is a further object to provide such a supplemental or stub axle that the wheel carried by it will occupy the same relative position to the vehicle as the original wheel occupied on the original axle.

It is an additional object to distribute the support of the vehicle and its axle over a large area on the supplemental or stub axle in order to secure great rigidity and equal distribution of strain.

Figure 1:
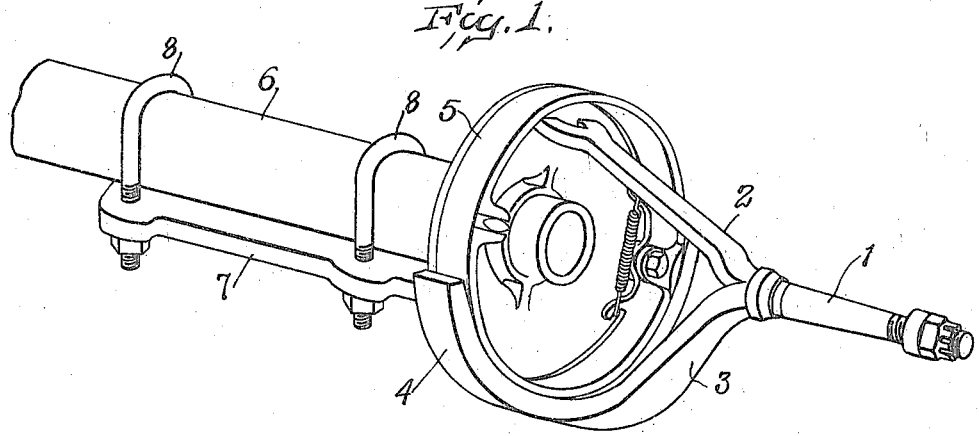
Figure 2:
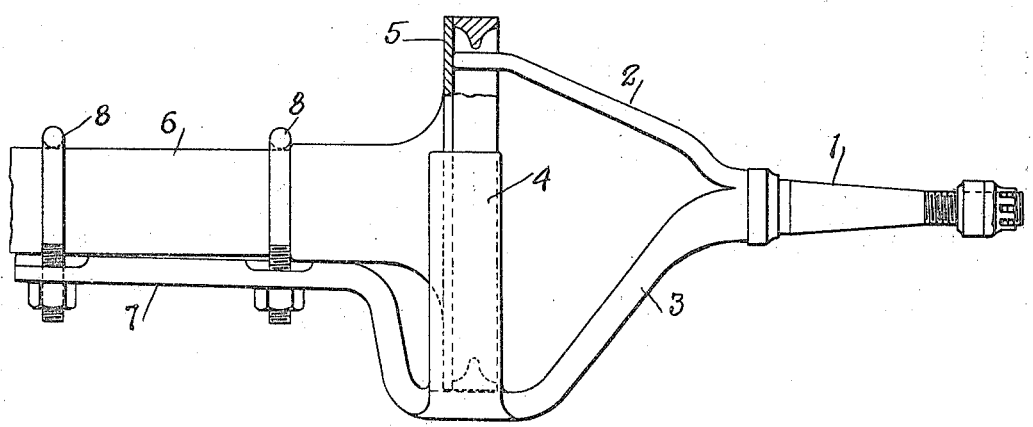

In the accompanying drawings, Figure 1 illustrates a perspective of my supplemental axle applied to the rear axle of an automobile; and Fig. 2 is a side elevation of my axle applied to the rear axle of an automobile.

In these drawings, 1 is the spindle of my stub axle, 2 is the upper brace, 3 is the lower brace, and 4 is a wing of the lower brace embracing the brake band 5. 6 is the main axle of the automobile or the portion of the axle which is inactive, the live axle turning within this inactive portion. 7 is the supporting arm held to the axle of the vehicle by the U-shaped bolts 8.

While I have shown and described one embodiment of my invention, it will be understood that the same has been chosen for the purposes of illustration only, and that I do not desire to be limited to the details of construction shown and described, for obvious modifications will occur to a person skilled in the art.

Having thus fully described my invention, what I claim as new and desire to secure by Letters Patent, is:—

1. In a device of the character described, a spindle in line with the main axis of the main axle, a brace extending downwardly from the inner end of said spindle and having a U-shaped portion embracing a brake drum at right angles to the main portion of said brace, a member lying under and along said main axle, bent downwardly to pass around said brake drum and connected to said U-shaped member under said drum, and fastening devices passing around said axle and through the member under said axle.

2. In a device of the character described, a spindle in line with the main axis of the main axle, an upwardly extending brace, one end of which is connected with the inner end of the spindle and the other end of which rests against a brake drum on said main axle, a downwardly extending brace, a U-shaped member embracing said brake drum and extending at right angles to said downwardly extending brace, a member lying adjacent to the main axle, and U-shaped bolts connecting said member to said main axle.

3. In a device of the character described, a spindle in line with the main axis of the main axle, an upwardly extending brace having its free end resting against the inner side of a brake drum on said main axle, a downwardly extending brace, a pair of arms extending outwardly and upwardly at right angles to said downwardly extending brace embracing a portion of the periphery of said brake drum, an upwardly and inwardly extending member connected to the point of union of said downwardly extending brace and arms, said member lying adjacent to the main axle on the under side thereof and connected thereto by U-bolts.

In testimony whereof I affix my signature.

NEWTON J. LEWIS.

Copies of this patent may be obtained for five cents each, by addressing the "Commissioner of Patents, Washington, D. C."